Patented Jan. 9, 1934

1,942,531

UNITED STATES PATENT OFFICE

1,942,531

LOW VISCOSITY VINYL POLYMER

Harold J. Barrett, Wilmington, Del., assignor to E. I. du Pont de Nemours & Company, Wilmington, Del., a corporation of Delaware No Drawing. Application June 3, 1930
Serial No. 459,105

11 Claims. (Cl. 260—2)

This invention relates to new compositions of matter. It relates more specifically to synthetic resins, and has particular reference to resins prepared by the polymerization of vinyl compounds. Still more particularly this invention relates to means for controlling the viscosity of these resins.

The preparation of synthetic resins, particularly those of the type derived from the polymerization of vinyl compounds, has been attended in the past with uncertainty. Those batches of polymer which had excellent color and high yield would often have viscosity so high as to make their use in finishes or in coating compositions difficult. Other batches made under apparently identical conditions would have good viscosity but would be very dark in color and would be produced only in low yields. The reason for these variations has previously not been understood, and has resulted in inability to secure a uniform product having good color and a viscosity suitable for the purposes to which it would be put.

This invention has as an object the production of new compositions of matter. Another object is the production in good yield of resins having suitable viscosity and excellent color. A further object of the invention is the production of resins, by the polymerization of vinyl compounds, which are suitable for use in plastics and coating compositions and in such other arts as resins find utility.

These objects, broadly speaking, are accomplished by polymerizing the film-forming materials in the presence of a small amount of a terpene-like substance, such as rosin, or of a rosin derivative, such as ester gum.

I have discovered that the previous inability to obtain products having uniform viscosity from different batches of raw materials can be overcome, and a uniform product of excellent viscosity characteristics can be obtained by mixing rosin with the raw materials prior to the polymerization of the resin.

It has been discovered that acids used in the same way as rosin accomplish the lowering of the viscosity of the final product, but I have discovered that, although rosin consists largely of abietic acid, it does not function in this respect wholly as an acid. This is illustrated by the fact that, although abietic acid is a weaker acid than acetic acid, yet rosin causes a greater decrease in viscosity than does acetic acid. Substances like ester gum accomplish the same result as rosin. Furthermore, my invention is not limited to rosin and its derivatives, but can be attained by the use of terpene-like substances such as dipentene and camphor. From an economic point of view, of course, the use of these last-named substances, because of their greater cost, is not to be preferred over rosin.

The following examples are given to illustrate the practical application of my invention, but they are to be deemed illustrative only and not in any sense limitative.

Example I

A mixture of 2400 g. vinyl chloride, 1600 g. toluene, 36 g. rosin, and 96 g. benzoyl peroxide was passed through an eight-foot, lead-lined reaction tube having a capacity of 800 cc. at a rate of 1000 cc. per hour, under a pressure of 500 lbs. per sq. in. and at a temperature of 105–110° C. The solution obtained by this process weighed 1696 g., contained 33.8% solids (indicating a yield of 45.8%), and was light colored. A 41% solution of the product had a viscosity less than 0.5 poise at 25° C., whereas a solution of polymer prepared from the same sample of vinyl chloride but in the absence of rosin, was a gel at this concentration.

Example II

A solution containing 712 g. vinyl chloride, 479 g. toluene, 14 g. ester gum, and 29 g. benzoyl peroxide was passed through a four-foot, lead-lined reaction tube of about 500 cc. capacity at a rate of 300 cc. per hour, under a pressure of 500 lbs. per sq. in. and at a temperature of 110–115° C. The solution of polymer obtained by this process weighed 825 g., contained 39.4% solids (indicating a yield of 41.7%), and has a viscosity less than 0.5 poise at 25° C.

Example III

A mixture of 2420 g. vinyl chloride, 605 g. vinyl acetate, 45 g. rosin, 90 g. benzoyl peroxide, and 1970 g. toluene was passed through an eight-foot reaction tube having a capacity of 800 cc. at 105–110° C. under a pressure of 500 lbs. per sq. in. Analysis showed that the solution obtained by this process weighed 3551 g., contained 37.4% solids (indicating a yield of 42.2%), and had a viscosity of 0.5 poise at 25° C.

Example IV

A solution containing 207 g. styrene, 12 g. rosin, and 343 g. ethyl benzene was heated at 110–120° C. for 72 hours. The ethyl benzene and unpolymerized styrene were then removed by steam distillation, leaving 153 g. of resinous product, which indicated a yield of 68.1%. Solutions of the product had lower viscosity characteristics than those of meta styrene prepared under the same conditions but without the rosin.

Example V

| | Parts |
|---|---|
| Aromatic hydrocarbon-soluble polymer of vinyl chloride prepared in the presence of rosin | 26.30 |
| Dibutyl phthalate | 2.64 |
| Toluene | 47.38 |
| Solvent naphtha | 23.68 |

This lacquer, which had a viscosity of less than 0.4 poise at 20° C., gave films which became hard within 18 hours at ordinary temperatures.

Example VI

| | Parts |
|---|---|
| Aromatic hydrocarbon-soluble polymer of vinyl chloride prepared in the presence of rosin | 27.42 |
| Dibutyl phthalate | 5.58 |
| Para toner red | 6.85 |
| Toluene | 40.13 |
| Solvent naphtha | 20.02 |

This enamel had a viscosity of about 0.4 poise at 20° C. and had excellent spraying characteristics. Films prepared from it became hard within 18 hours at ordinary temperatures.

Example VII

| | Parts |
|---|---|
| Aromatic hydrocarbon-soluble polymer of vinyl chloride prepared in the presence of rosin | 28.60 |
| Dibutyl phthalate | 2.87 |
| Chrome orange | 12.31 |
| Toluene | 37.50 |
| Solvent naphtha | 18.72 |

This orange enamel had a viscosity of about 0.4 poise at 20° C. and gave films which became hard within 18 hours at ordinary temperatures.

The temperatures recited in the specific examples have been chosen for convenience and do not illustrate limitations. Temperatures considerably higher and considerably lower can be used with satisfactory results. For instance, Example I was carried out at 130° C. with satisfactory results.

The polymerization of the substances to which rosin has been added may take place either in a continuous flow process or in a batch process.

With certain resins which have a tendency to darken during this treatment, a satisfactory color may be maintained with anti-darkening agents such as ethylene oxide.

An advantage of this invention is that it furnishes means for controlling the viscosity of polymerized vinyl derivatives. Another advantage is the preparation of new compositions of matter from polymerized vinyl derivatives and terpene-like substances such as rosin. Another advantage is that the preparations are suitable for high-build coating compositions, that is, coating compositions having a high percentage of film-forming constituents in relation to solvent at working viscosities.

As many apparently widely different embodiments of this invention may be made without departing from the spirit and scope thereof, it is to be understood that I do not limit myself to the specific embodiments thereof except as defined in the appended claims.

I claim:

1. The method of making a composition of matter which comprises passing a solution containing vinyl chloride, toluene, benzoyl peroxide, and rosin, under a pressure of about 500 pounds per square inch, through a lead-lined reaction tube heated to a temperature between about 105° and about 130° C.

2. The method of making a composition of matter of matter which comprises passing a solution containing a vinyl ester, a solvent for the vinyl ester, an organic peroxide catalyst, and rosin, under pressure, through a lead-lined reaction tube heated to a temperature of about 115° C.

3. The method of making a composition of matter which comprises heating under pressure a solution containing one of a group of compounds consisting of vinyl esters and styrene, an organic peroxide catalyst, and one of a group of compounds consisting of rosin and rosin esters.

4. The method of making a composition of matter which comprises polymerizing a vinyl compound of the group consisting of vinyl esters and styrene in the presence of one of a group of compounds consisting of rosin and rosin esters.

5. The product of the polymerization of a vinyl compound of the group consisting of vinyl esters and styrene in the presence of one of the group of compounds consisting of rosin and rosin esters.

6. The product of the polymerization of a vinyl compound of the group consisting of vinyl esters and styrene in the presence of rosin.

7. The product of the polymerization of vinyl chloride in the presence of rosin.

8. The product of the polymerization of styrene in the presence of rosin.

9. The method of making a composition of matter which comprises heating a solution containing vinyl chloride, vinyl acetate, and rosin under pressure at a temperature of about 105°–110° C.

10. The method of making a composition of matter which comprises polymerizing vinyl chloride and vinyl acetate in the presence of rosin.

11. The product of the polymerization of vinyl chloride and vinyl acetate in the presence of rosin.

HAROLD J. BARRETT.